Eugène Germain Paul Mopin
INVENTOR
his ATTY.

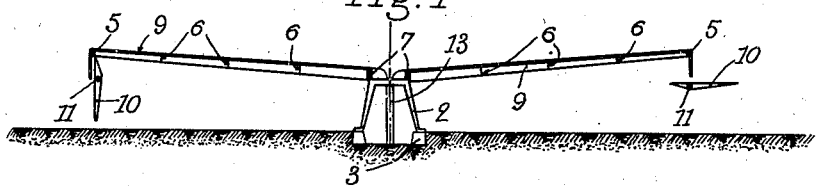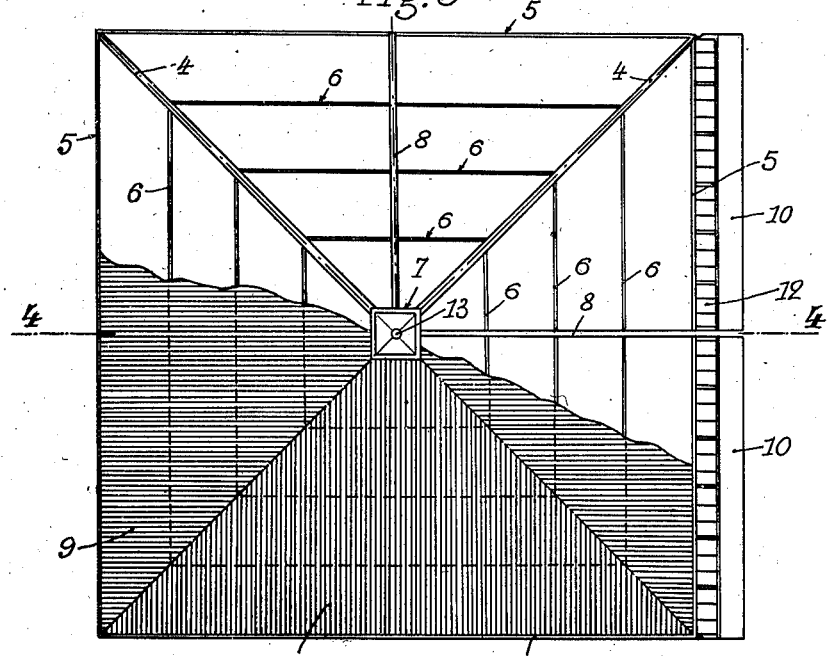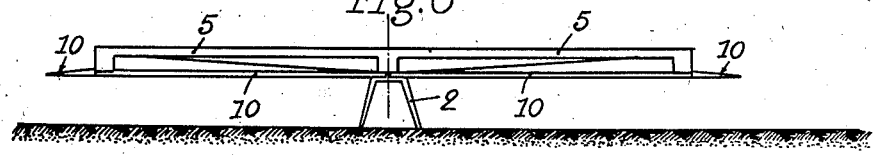

July 14, 1936.   E. G. P. MOPIN   2,047,644
SHED AND ANALOGOUS CONSTRUCTION
Filed Sept. 29, 1934   5 Sheets-Sheet 3

Eugène Germain Paul Mopin
INVENTOR his ATTY.

July 14, 1936.  E. G. P. MOPIN  2,047,644
SHED AND ANALOGOUS CONSTRUCTION
Filed Sept. 29, 1934   5 Sheets-Sheet 4

Eugène Germain Paul Mopin
INVENTOR
his ATTY.

July 14, 1936.  E. G. P. MOPIN  2,047,644
SHED AND ANALOGOUS CONSTRUCTION
Filed Sept. 29, 1934   5 Sheets-Sheet 5
Fig.13
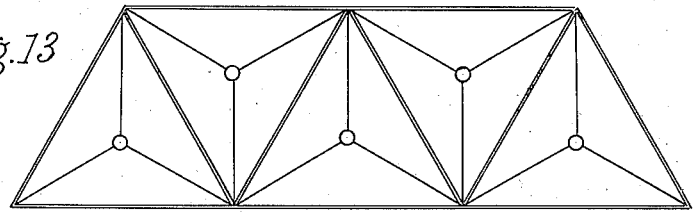
Fig.14
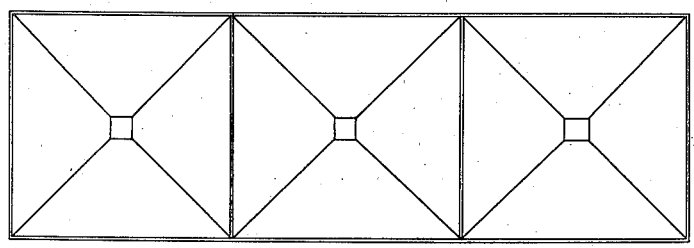
Fig.15
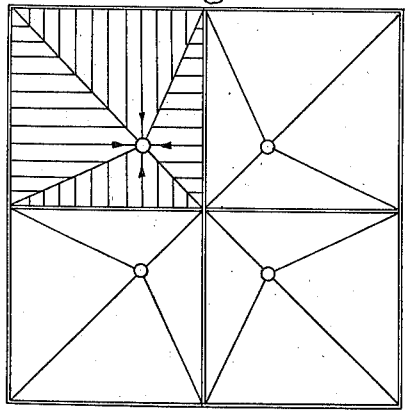
Fig.16
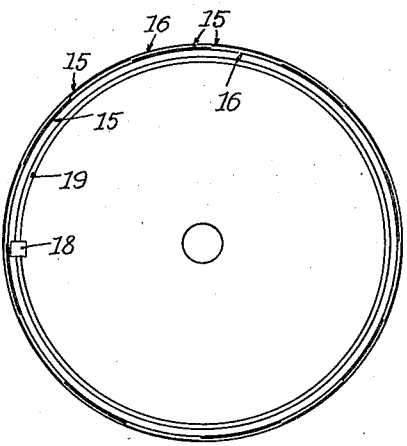
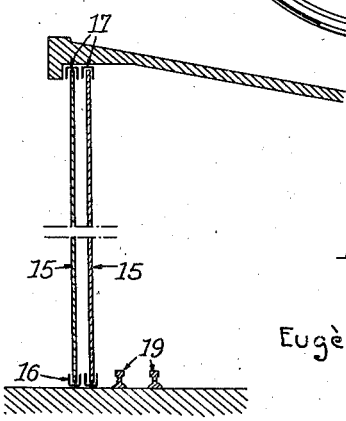
Fig.17
Eugène Germain Paul Mopin
INVENTOR
his ATTY.

Patented July 14, 1936

2,047,644

UNITED STATES PATENT OFFICE 2,047,644

SHED AND ANALOGOUS CONSTRUCTION

Eugène Germain Paul Mopin, Paris, France

Application September 29, 1934, Serial No. 746,072
In France October 4, 1933

6 Claims. (Cl. 108—1)

The present invention has for its object improvements in sheds or like constructions permitting to utilize to the maximum degree the roofed surface.

It is a known fact that in the case of aeroplane sheds, only a small part of the roofed surface can be employed to protect the aeroplane; the necessity to frequently displace the aeroplanes, to cause them to enter or to leave the shed, obliges to leave within the shed a wide free passage so as not to have to displace several aeroplanes in order to remove those located at the back part of the shed.

On the other hand, the always increasing span of the aeroplanes forbids to support the roof upon closely-spaced posts and renders the construction of aeroplane sheds heavy and expensive.

A perfect aeroplane shed must be so designed that any aeroplane may be removed or brought in without the necessity of displacing the other machines situated in the same shed, and only in this case the roofed surface can be entirely utilized.

The construction in conformity with the invention fulfills the aforesaid conditions and is chiefly distinguished in that it consists of one or more structures each comprising a roof having the form of an inverted pyramid or cone resting by its apex upon a single support.

Owing to this arrangement the whole of the external periphery of the construction is accessible from the exterior, without any post or supports being necessary and hindering the entrance and the exit of the aeroplanes or other machines or vehicles.

Moreover, the pyramidal or conical form of the roof permits to utilize to the maximum the strength of the employed materials and to obtain light roofs.

Other characteristics of the invention will result from the description which will follow.

In the accompanying drawings given solely by way of example:

Fig. 4 is a diagrammatic section, on the line 4—4 of Figure 5, of an embodiment of the invention;

Fig. 5 is a plan view, with parts of the roof broken away, of the structure shown in Figure 4;

Fig. 6 is an elevational view thereof;

Figures 13 to 15 are, diagrammatic, plan views of composite structures in conformity with the invention;

Figure 16 shows diagrammatically in plan, the doors of a circular shed;

Figure 17 is a partial vertical section of the same shed on a larger scale, showing the arrangement of the doors.

Figure 1:
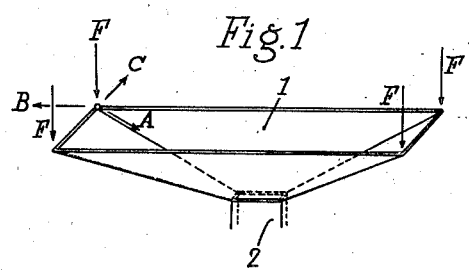
Fig. 1 is a diagrammatic, perspective, view of a construction in conformity with the invention showing the stresses exerted upon such a construction.
Figure 2:
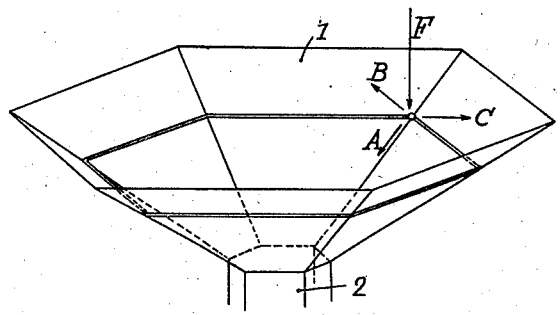
Figs. 2 and 3 are views analogous to Fig. 1 of modifications of this construction.
Figure 3:
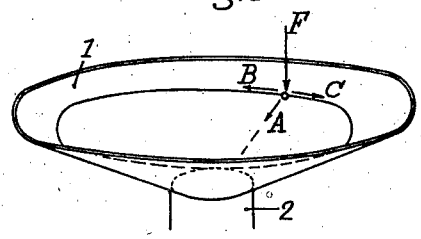

According to the examples diagrammatically shown in Figures 1 to 3, the construction comprises a roof 1, having the form of a pyramid or an inverted cone, i. e. the base of which is situated at the top and which is secured by the apex of the said cone or one of the said pyramid to a pillar 2 or other single supporting member preferably located at the centre of the construction.

A construction of this kind offers great advantages in the way of lightness, as will be further set forth.

In fact, the weight of a construction, chiefly depends upon the proper use of the material or in other words, upon the uniformity of the stresses to which the different parts of the construction are subjected.

It is a known fact that members subjected to bending stress utilize the material in a non-economical manner, because of the extreme fibres of a section being subjected to maximum stresses and the fibres near the neutral fibre to very little stresses or to no stress at all.

On the contrary, the parts subjected to tension, to compression or to shearing completely use the material. It is thus evident that the most economical construction as what concerns these considerations, will be the one which is so designed as to be in all parts subjected to compression, to tension or to shearing.

The construction, forming the object of the present invention and diagrammatically represented in Figures 1 to 3 is of this type.

In fact, any vertical load uniformly distributed, or symmetrical loads, may be decomposed into two kinds of forces; the one directed according to the generatrices of the cone or the edges of the pyramid forming the roof, and directed towards the apex of this cone or pyramid, and the others directed according to the broken lines, tangents or curves, resulting from the intersections of horizontal planes with the surface of the roof.

For instance as shown in Figures 1, 2 and 3 the load F may be decomposed into three forces: the first A, directed towards the apex of the pyramid or cone forming the roof, the others B and C directed according to the sides of the polygon formed by the intersection of a horizontal plane with the roof surface (in the case of a pyramid roof) or in the case of a conical roof according to the tangents of the circle which represents the intersection of the horizontal plane with the surface of the roof.

The force A compresses the fibres near the part of the roof passing through the point of application of this force and directed towards the apex, whilst the forces B and C exert a tension upon the horizontal polygon or the circle formed by the intersection of the horizontal plane containing these forces with the surface of the roof.

If the roof is uniformly or symmetrically loaded it will be in equilibrium.

The tension stresses B and C tend to flatten the roofs, and the compression stresses A compress the lower circle or polygon which is located near the apex of the conical or pyramid roof.

In the case of an unsymmetrically loaded roof, certain parts of the roof may be subjected to bending stresses. But it should be observed that in the case of large roofed surfaces, the unsymmetrically stresses are very small as compared with the uniformly distributed load, so that only the external symmetrical loads, may be considered, the loads being counterbalanced by the parts subjected to the traction or to the compression.

Various forms of construction of buildings in conformity with the invention have been shown in Figures 4 to 12.

The example shown in Figures 4 to 6 is a shed the roof of which has the form of an inverted pyramid with a square base. This shed comprises a central support 2, consisting of any suitable material, resting upon foundations 3. The roof is entirely supported by this central support.

The framing of the roof comprises main corner beams 4 subjected to compression, an outer belt 5 and intermediate belt 6 subjected to tension and an inner or central belt 7 upon which rest the corner beams 4 and which is subject to compression. Auxiliary beams 8 are mounted between the corner beams 4 and rest on the one hand upon the outer belt 5 and on the other hand upon the inner belt 7. These auxiliary beams serve themselves as a support for the intermediate belts 6. The parts 9 forming the facing of the roof (Fig. 4) are laid upon the belts 6.

The shed thus constructed may be provided, on each of its sides, with any desired number of doors 10 (two on each side in the example shown in Figures 4 to 6). These doors are preferably pivoted upon horizontal pins 11 supported by the roof, this permitting of completely raising them and leaving entirely free the access to the shed. The doors 10 may comprise glass panes 12 at the upper part. The water from the roof may be conducted by a central conduit 13.

In the square sheds of the type above described, the belts 5, 6 are not only subjected to tension stresses but also to local bending stresses in order to transmit the reactions upon the beams 4. The roof parts 9 are subjected exclusively to the bending, and do not lighten, consequently the main framing formed by the beams 4 and the belts 5, 6. The considered bending stresses are the more important as the free span of the belt between the principal beams is greater.

This span can be reduced and hence the bending stresses by constructing sheds the roof of which has the form of an inverted pyramid with a polygonal base having a great number of sides. The best conditions for the use of the material are thus obtained when the number of sides of the pyramid roof is infinite i. e. when the roof has a conical shape. In this latter case neither of the parts of the construction is subjected to the bending.

Figure 7:
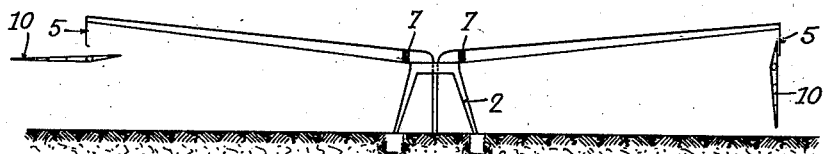
Figures 7 to 9 are views analogous to Figures 4 and 6, of a modification.
Figure 8:
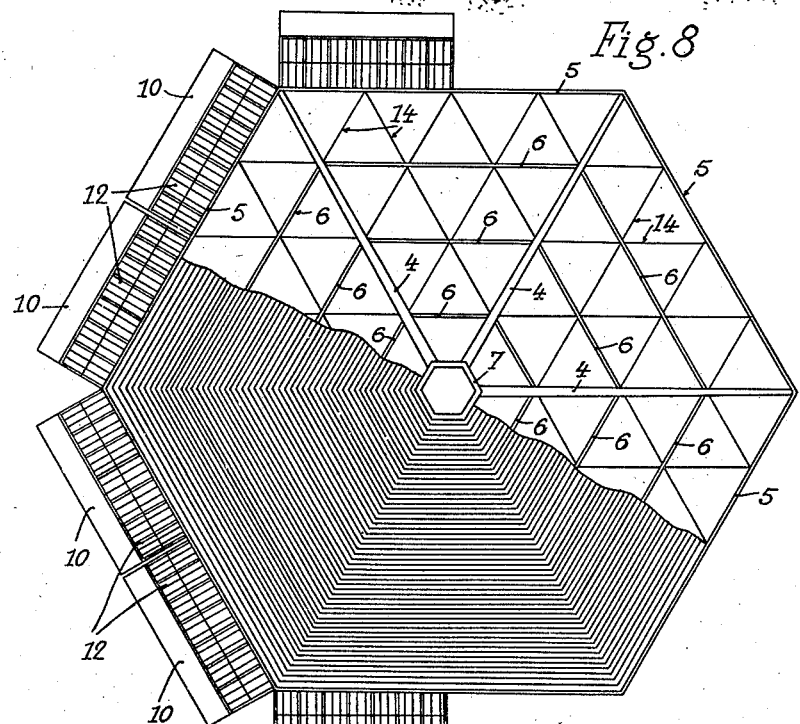
Figure 9:
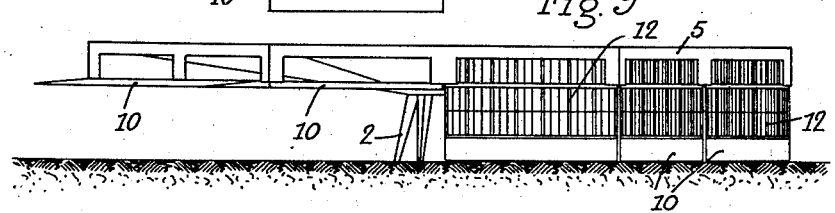
Figure 10:
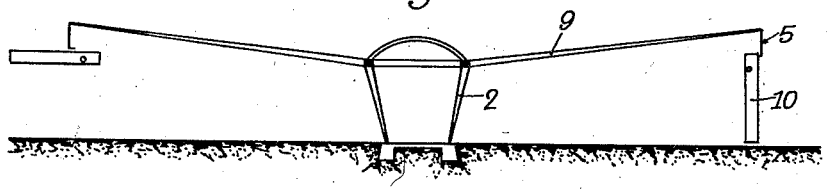
Figures 10 to 12 are views analogous to Figures 4 and 6 of another modification.
Figure 11:
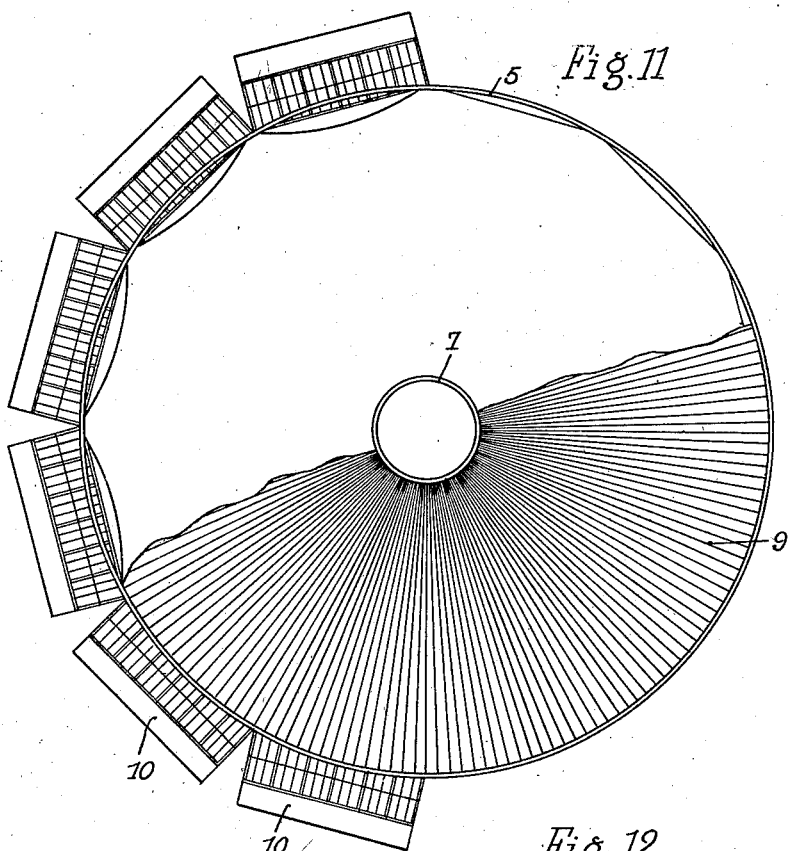
Figure 12:
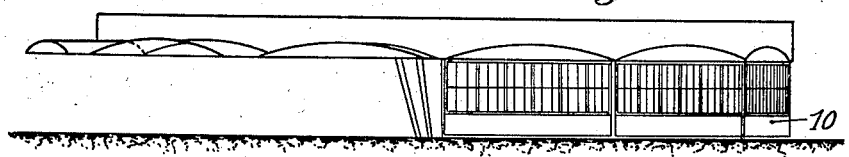

In Figures 7 to 9 a hexagonal shed is shown, constructed in an analogous manner to that of Figures 4 to 6. The framing of the roof comprises corner beams 4 resting upon a central belt 7, an outer belt 5 and intermediate belts 6. Auxiliary beams 14 disposed as a trelliswork between the beams 4 serve to support the roof parts 9. These roof parts are preferably parallel with the belts 6 so that they are also subjected to the tension and, hence, relieve the belts 6, which may even be eliminated.

In the case of sheds with conical roof (Figures 10 and 12) the radial beams 4 and the intermediate belts 6 are eliminated, the roof simply consisting of an outer belt 5 and a central belt 7 which are connected together by the roof parts 9. These roof parts are situated according to the generatrices of the cone and are connected together in such manner as to withstand the forces of compression directed towards the apex of the cone as well as the forces of tension which tend to flatten the cone and to separate the parts 9.

The sheds or like structures constructed according to the aforesaid principle may be placed in groups in order to form composite structures. Examples of such constructions are represented in Figures 13 to 15 in the example of Figure 13, the composite shed consists of single sheds which are juxtaposed and the roof of which has the form of a pyramid with a triangular base. In Figures 14 and 15, the single sheds the assemblage of which forms the composite construction, have a square form.

It is evident that any other suitable forms may be used. In particular, it is not necessary that each unit structure shall be symmetrical and regular. It suffices that the whole structure shall be symmetrically balanced as shown in Figure 15. Even in the case of a single independent structure symmetry is not obligatory although it offers advantages as to equilibrium and to simplicity of the construction. The form of the shed, in plan, is indifferent and is to be chosen in conformity with the local conditions.

It will be thus observed that the structures according to the invention afford a ready access to the whole covered surface by the periphery of this surface, this assuring, in particular, the complete use of the sheds adapted to contain cumberous apparatus which must be frequently displaced, such as aeroplanes, motor cars, and in general, all kinds of vehicles.

Obviously other kinds of closing may be employed for the sheds according to the invention than pivoting doors 10 shown in Figures 4 to 15. Thus in the example shown in Figures 16 and 17, which more particularly refers to sheds with conical roof, the doors 15, which are centered in plan, are mounted so as to roll upon two circular concentric roller paths 16, and are guided at the top part by suitable guides 17.

The total surface of the doors 15 may thus be developed on two thicknesses so as to entirely close the whole periphery of the shed as represented. The maximum opening of the shed may be obtained by bringing the doors together upon one half of the periphery, thus leaving the other half entirely free.

The doors may also be so arranged as to render free a greater part of the periphery of the shed, for instance by mounting these doors on a greater number of roller paths 16. Thus by using three roller paths, it is possible to assemble the doors upon one third of the periphery, and open the shed for the two-thirds.

The use of four roller paths would permit of opening the shed for the three-quarters of its periphery.

In order to operate the doors 15 it is possible to employ a truck 18 provided with a gripping device for the doors and also with a driving motor, the said truck moving on rails 19 parallel with the roller paths 16.

Of course, it is also possible to use movable doors, of the aforesaid type, for sheds the form of which in plan, is square, hexagonal, or other, and is regular or irregular. The arrangement and the outline of the roller paths 16, as well as the form and the number of the doors 15, which may be flat or curved, depend obviously upon each particular case.

The invention contemplates not only the aviation sheds and motor car garages, but also roofed markets, exhibition buildings and all other roofed sheds and structures. These sheds or other structures may be built of any suitable materials: wood, metal, reinforced concrete, as separate parts preliminarily prepared, as well as a monolith construction.

Obviously the invention is by no means limited to the forms of construction described and represented, which have been chosen solely by way of example.

Having now described my invention, what I claim as new and desire to secure by Letters Patent is:

1. A construction adapted to cover a large surface, comprising a single support disposed in the central portion of the surface which is to be covered and a main hollow body provided with an apex resting on said support and with walls covering said large surface, said hollow body having moreover practically rectilinear generatrices extending upwards from said apex and comprising a frame consisting of a series of ring-shaped and radial members all of which are disposed in and constitute the walls of said body, which is self-carrying without the help of any auxiliary supporting or reinforcing members.

2. A construction adapted to cover a large surface, comprising a single support disposed in the central portion of the surface which is to be covered, and a main hollow body provided with an apex resting on said support and with walls covering said large surface, said hollow body having moreover practically rectilinear generatrices extending upwards from said apex and comprising an external ring-shaped belt member of great dimensions corresponding to the large surface which is to be covered, an inner ring-shaped belt member having relatively small dimensions and adapted to rest upon said support and a series of radial and intermediary ring-shaped members between said external and inner belts, all of these members constituting the walls of said hollow body and forming a homogeneous unit which is self-carrying and rests upon said support without the help of any other supporting and reinforcing means.

3. A construction as claimed in claim 2, wherein said hollow body assumes substantially the form of a pyramid and said radial members consist of beams arranged according to the edges of the pyramid.

4. A construction as claimed in claim 2, wherein said body further comprises auxiliary radial members, mounted between said first radial members and bearing upon said internal and external belt members, and intermediate belts arranged between said external and internal belts, and resting upon said auxiliary radial members.

5. A construction as claimed in claim 2, wherein said body further comprises covering elements secured thereto and arranged in a direction parallel with said belt members whereby said elements are subjected to tension stresses.

6. A construction according to claim 2 wherein said hollow body assumes substantially the form of a cone and said radial members consist of beams arranged according to the generatrices of the cone.

EUGÈNE GERMAIN PAUL MOPIN.